May 31, 1966 T. W. McGLAUGHLIN 3,253,301
NON-CIRCULAR SPINNERET ORIFICES
Filed Jan. 14, 1963

INVENTOR.
THOMAS W. McGLAUGHLIN
BY *Kelly O. Corley*
ATTORNEY

United States Patent Office 3,253,301
Patented May 31, 1966

3,253,301
NON-CIRCULAR SPINNERET ORIFICES
Thomas W. McGlaughlin, Pensacola, Fla., assignor to
Monsanto Company, a corporation of Delaware
Filed Jan. 14, 1963, Ser. No. 251,303
1 Claim. (Cl. 18—8)

The present invention relates to the construction of spinneret orifices and more particularly to such orifices haveing non-circular outlines and very small dimensions.

Spinneret orifices made according to the prior art were generally produced by one of three methods. The most commonly used method was to drill a line of holes along the outline of the orifice and mill out the webs between adjacent holes. This work is performed in its entirety under a microscope, and is limited to production of relatively large orifice dimensions. Sharp angles cannot be satisfactorily produced with existing equipment. A second method is to drill ultrasonically, wherein a tool is made up to the size and shape of the desired orifice and vibrated in an abrasive slurry to cut the hole. The tools required are delicate, difficult to produce, and have a relatively short service life. In addition the ultrasonic equipment itself is quite expensive. The third method is to burn the hole out of the blank with an electronic beam. The electronic beam equipment is extremely expensive, and the rate of production is so low that this method is not competitive as a commercial process. Various methods of spark cutting are also in use.

Accordingly, a principal object of the invention is to provide means for forming spinneret orifices of arbitrarily chosen configurations.

A further object is to provide orifice manufacturing techniques permitting a rapid and economical production of spinneret orifices.

A further object is to provide techniques of the above character which are extremely flexible and are adapted to produce orifice dimensions and configurations to any desired degree of accuracy.

A further object is to provide methods of the above character permitting the production of spinneret orifices which cannot be made by conventional prior art processes.

Other objects of the invention will in part be obvious and will in part appear hereinafter.

The invention accordingly comprises the several steps and the relation of one or more of such steps with respect to each of the others, and the article possessing the features, properties, and the relation of elements, which are exemplified in the following detailed disclosure, and the scope of the invention will be indicated in the claim.

For a more complete understanding of the nature and objects of the invention, reference should be had to the following detailed description taken in connection with the accompanying drawings, in which.

Figure 1:
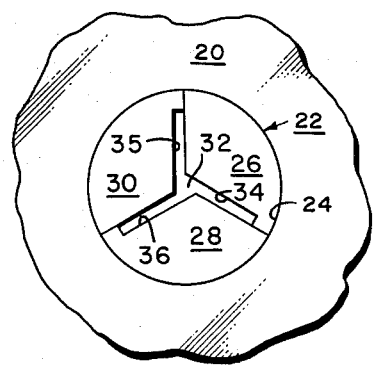
FIGURE 1 is a fragmentary plan view of a spinneret plate containing an orifice constructed according to the present invention, and shows an assembly of segments which define the orifice.
Figure 2:
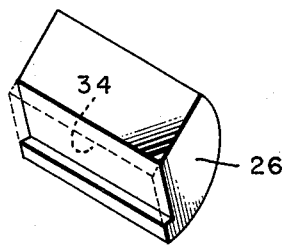
FIGURE 2 is a perspective view illustrating the construction of one of the segments of the FIGURE 1 device.

The general principles of the invention are illustrated in FIGURES 1 and 2. Referring now to FIGURE 1 there is shown a fragment of a spinneret mounting plate 20 having an orifice assembly 22 mounted in and rigidly supported by the walls of a suitable aperture 24. Assembly 22 as illustrated comprises three segments 26, 28 and 30 whose outer surfaces form a solid body mating with aperture 24, with interior portions of the abutting surfaces of the segments being relieved to form a three-legged orifice 32.

Referring now to FIGURE 2, segment 26 is shown in a perspective view to demonstrate construction. Segment 26 may be readily formed from a 120° segment of a right circular cylinder by machining away or relieving the area 34 from an original contour indicated in dotted lines to the finished contour shown in the solid lines. This operation may be done, for example, with a micro-mill. When segment 26 is assembled next to similar segment 28, relieved area 34 on segment 26 forms with an adjacent side of segment 28 one leg of the three-legged orifice 32. Similar relieved areas 36 and 38 on segments 28 and 30 respectively provide for the remaining legs of orifice 32.

It is particularly noted that the material to be removed from segment 26 is directly accessible on an exterior surface of the segment for the entire depth of the orifice, rendering possible precision machining of an orifice having any depth and any desired internal configuration, with relatively simple equipment. Thus, interior galleries may be readily formed to distribute polymer flow to various parts of the completed orifice. All internal surfaces may be brought to a mirror finish as desired, which is difficult or impossible with other known processes for producing such minute orifices. The amount of material removed may be much more readily controlled and with a greater degree of accuracy than with conventional methods, and as previously noted need not be done under a microscope. A complete orifice may be produced by the method of the present invention in a small fraction of the time required by conventional production methods, e.g., in one-half or less time than that usually required.

When each of the component segments has been machined, polished, etc., they are assembled to form assembly 22. Aperture 24 is drilled and reamed to snugly receive assembly 22, a tight press fit being adequate. Assembly 22 is then pressed into aperture 24, after which the lower end of assembly 22 is ground level with the bottom surface of plate 20. The end of assembly 22 which is first inserted into aperture 24 may be beveled slightly if desired to facilitate entry into the aperture. It is particularly noted that the walls defining aperture 24 automatically align the several segments with respect to one another when assembly 22 is inserted, assuring precise registry of the various relieved portions to form the desired orifice configuration. Thus, tedious alignment of the segments under a microscope is eliminated and assembly is greatly facilitated.

It is noted that the aperture 24 need not necessarily be circular in cross section or cylindrical, although generally it is preferable from the standpoint of simplicity and economy that aperture 24 have the form of a right circular cylinder. In a typical embodiment, aperture 24 may have a diameter of 0.125 inch and thus have a total cross sectional area of 0.012 square inch. Thus approximately 12 pounds total pressure would be exerted on assembly 22 per thousand pounds per square inch pressure difference between opposite sides of plate 20. It has been found that when assembly 22 is a tight press fit in aperture 24, the assembly is securely retained therein although there may be a pressure differential on opposite sides of plate 20 on the order of thousands of pounds per square inch.

The segments may be plated with a suitable soft, low-melting metal, such as silver, prior to assembly, if desired. The segments are then assembled and pressed into aperture 24, after which the lower ends may be trimmed flush with plate 20. The assembly including plate 20 may then be heated, preferably in a reducing atmosphere, sufficiently to melt the soft metal plating and fuse the entire assembly into an integral unit. Particularly when a specific spinneret is intended to be used only for a short period of time, as for evaluation of an orifice design, it is not essential to plate the segments and fuse the assembly into an integral unit, although to do so is preferable if the spinneret is intended for extended usage.

Figure 3:
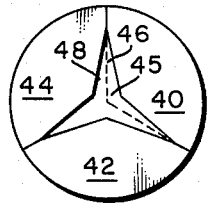
FIGURES 3 through 5 are plan views illustrating various other orifice constructions, and demonstrating the flexibility of the present method.
Figure 4:
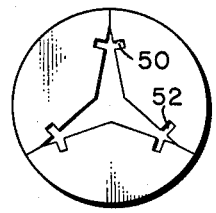
Figure 5:
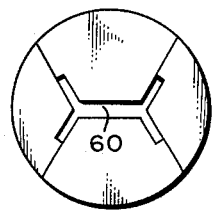

The flexibility permitted by the present invention is illustrated in FIGURES 3, 4 and 5. As shown in FIGURE 3, three segments, 40, 42 and 44 are so machined as to form a three-pointed star orifice. Thus, as indicated in dotted lines, relieved portion 45 on segment 40 may be formed from a 120° blank by removing the material enclosed within the dotted line 46 in two simple machining operations. Segments 42 and 44 are similarly formed, and when assembled with segment 40 define an orifice 48. A filament extruded through orifice 48 will have a cross section which has a shape somewhere between the configuration of orifice 48 and a circle, depending upon the viscosity and surface tension of the extruded polymer and upon the quench time. By properly controlling these factors, the extruded filament may have a cross section in the form of a three-pointed star, an equilateral triangle or any further degenerated version of these shapes, finally approaching a circle.

Referring to FIGURE 4, additional slots 50 and 52 may be provided near opposite ends of relieved portion 45 in the FIGURE 3 embodiment, together with similar slots on the remaining segments, to provide a slot or orifice configuration as illustrated in FIGURE 4. Since the material to be removed in slots 50 and 52 is directly accessible from the surface of the segment, a simple kerf may be made conveniently by a milling or sawing operation.

Each of the embodiments in FIGURES 1, 3 and 4 use three 120° segments of a right circular cylinder as a basis for the orifice design. This is not a limitation on the slot design permitted by the invention, as illustrated in FIGURE 5, wherein four segments are properly machined so as to provide an orifice 60. Other configurations and numbers of segments may readily be produced according to the invention.

Accordingly the orifice construction techniques disclosed above provide simple and effective methods for forming spinneret orifices of arbitrarily chosen configurations, and are particularly useful in forming orifices with non-circular cross sections. The segmental orifice constructions as herein generally and specifically disclosed permit great flexibility in spinneret construction, and are adapted to produce orifice dimensions and configurations with great accuracy. Since the segmental construction permits direct access to areas which are to become the interior surfaces of the completed orifices, the production of arbitrary interior dimensions and shapes is facilitated.

It will thus be seen that the objects set forth above, among those made apparent from the preceding description, are efficiently attained and, since certain changes may be made in carrying out the above method and in the article set forth without departing from the scope of the invention, it is intended that all matter contained in the above description or shown in the accompanying drawing shall be interpreted as illustrative and not in a limiting sense.

It is also to be understood that the following claim is intended to cover all of the generic and specific features of the invention herein described, and all statements of the scope of the invention which, as a matter of language, might be said to fall therebetween.

Having described my invention, what I claim as new and desire to secure by Letters Patent is:

A spinneret orifice assembly comprising in combination:
(a) a mounting plate,
(b) walls defining a right circular cylindrical aperture extending through said plate,
(c) an orifice assembly comprising a plurality of segments press-fitted in said aperture,
(d) said segments abutting one another and said walls with outer portions of said segments being complementary to one another and to said walls, so as to substantially completely occupy the space immediately adjacent said walls,
(e) inner portions of said segments, spaced from said walls, being relieved to provide interior surfaces defining a non-circular orifice extending through said assembly,
(f) and abutting portions of said segments and of said walls being bonded together by a fused soft metal coating.

References Cited by the Examiner

UNITED STATES PATENTS

| | | | |
|---|---|---|---|
| 1,366,166 | 1/1921 | Criggal | 18—8 |
| 2,619,853 | 12/1952 | Lange | 76—107 |
| 2,820,374 | 1/1958 | De Wolf | 76—107 |
| 2,879,676 | 3/1959 | Burkhardt et al. | 18—8 X |
| 3,006,026 | 10/1961 | Martin et al. | 18—8 |
| 3,092,873 | 6/1963 | Kay et al. | 18—8 |

FOREIGN PATENTS

| | | |
|---|---|---|
| 212,297 | 7/1957 | Australia. |
| 895,100 | 3/1944 | France. |
| 253,209 | 1925 | Great Britain. |

WILLIAM J. STEPHENSON, *Primary Examiner.*

MICHAEL V. BRINDISI, *Examiner.*

L. S. SQUIRES, *Assistant Examiner.*